United States Patent Office 3,074,037
Patented Jan. 15, 1963

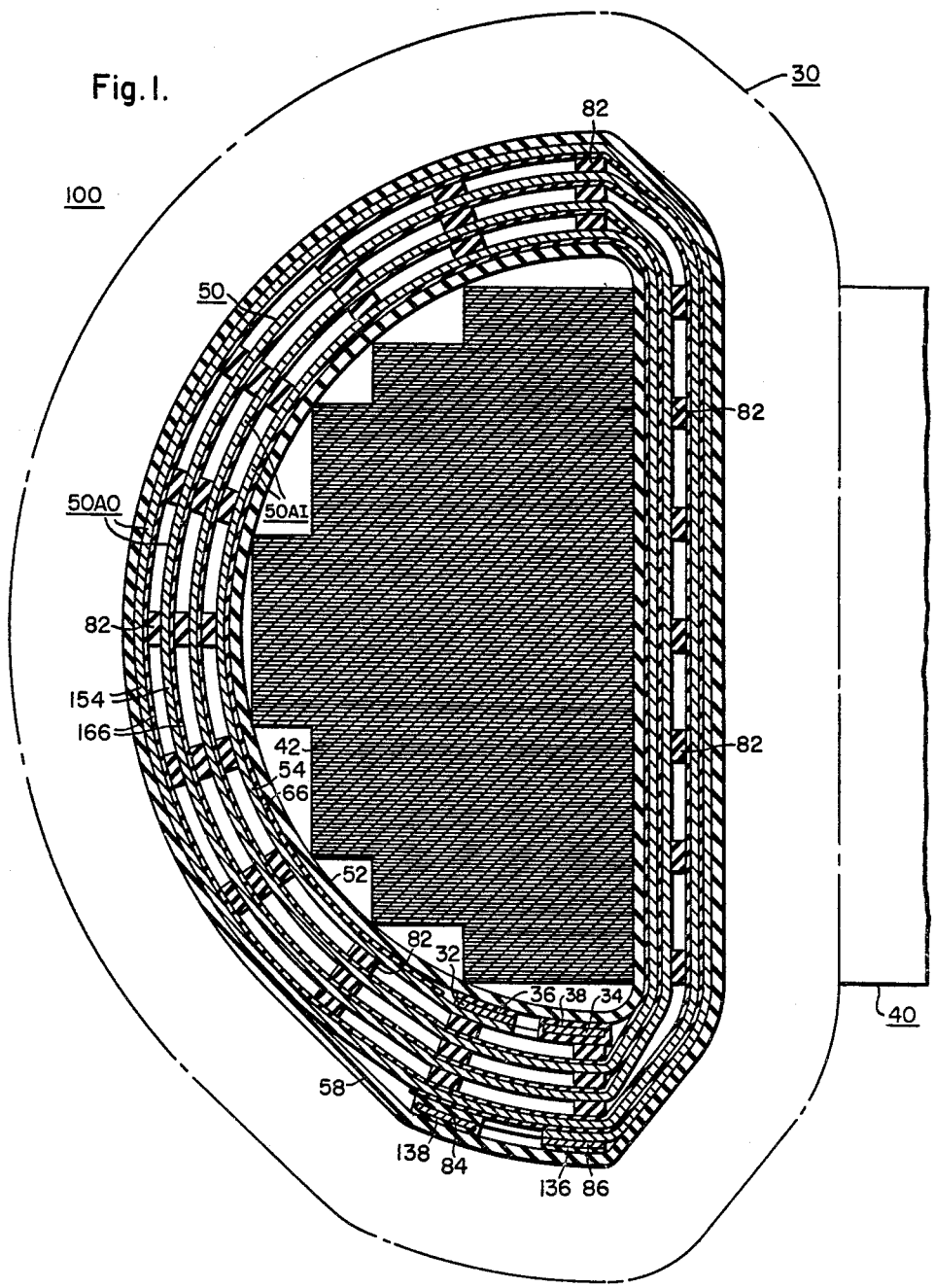

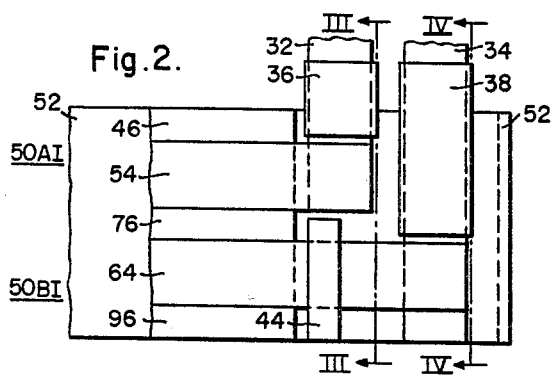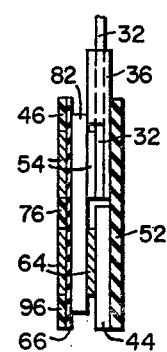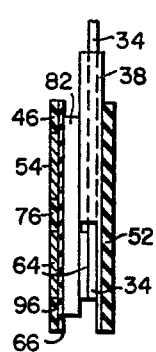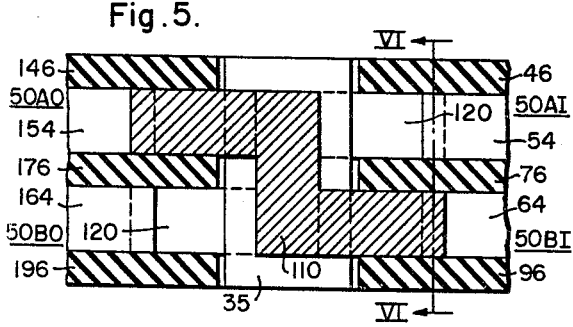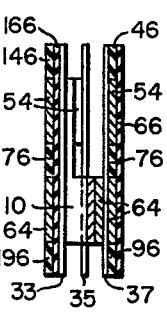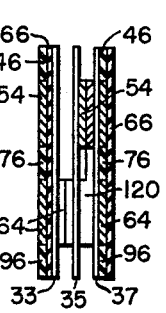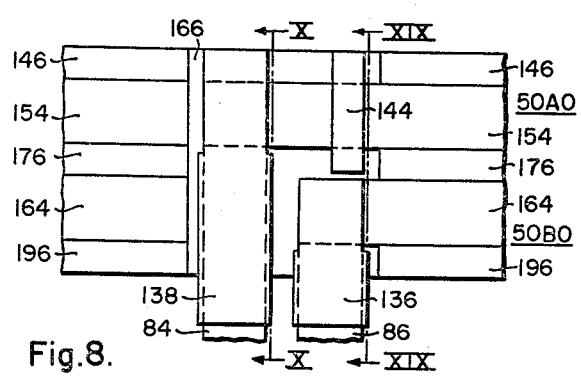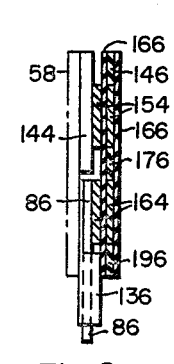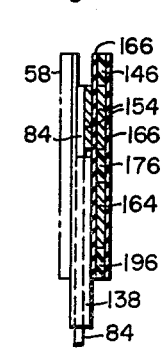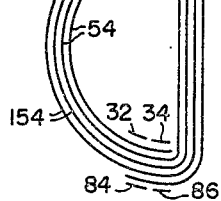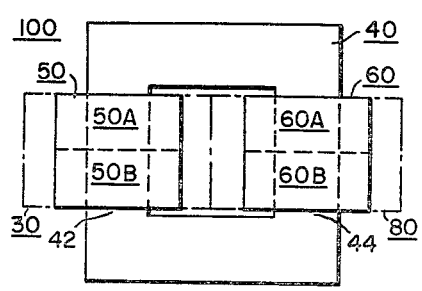

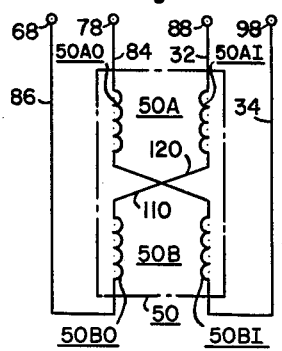
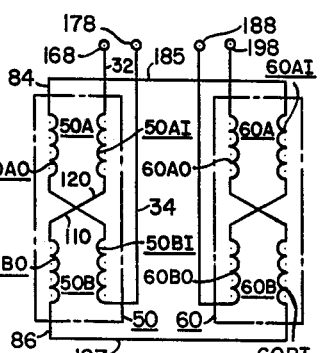
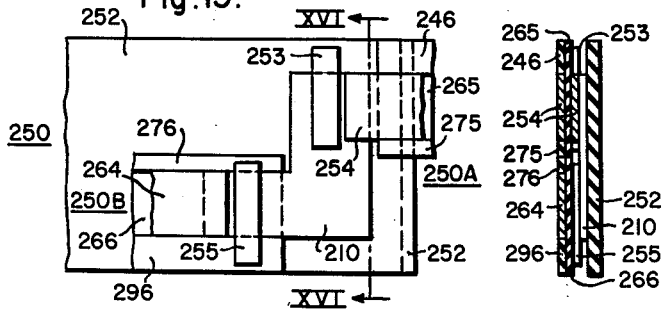
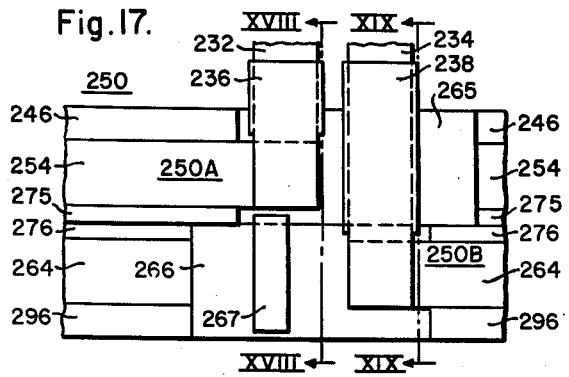
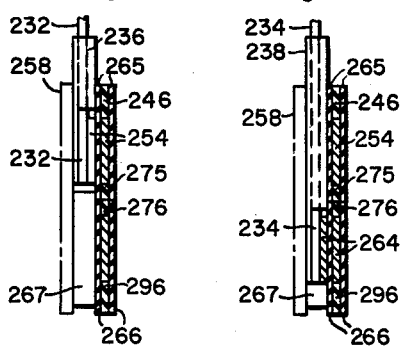
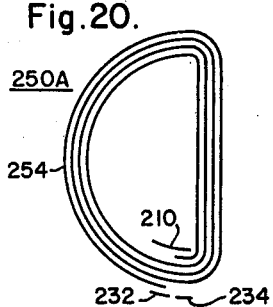

3,074,037
ELECTRICAL INDUCTIVE APPARATUS
Gerhard M. Stein, Sharon, Pa., assignor to Westinghouse Electric Corporation, East Pittsburgh, Pa., a corporation of Pennsylvania
Filed Sept. 4, 1958, Ser. No. 759,064
12 Claims. (Cl. 336—199)

This invention relates to electrical inductive apparatus, such as transformers and, more particularly, to winding arrangements in such apparatus.

In certain types of electrical inductive apparatus, such as transformers, spiral windings or coils are sometimes provided which include a plurality of turns of a layer of conducting sheet or strip material wound together with a layer of insulation. Such a winding includes one turn per layer with the turn-to-turn insulation also providing the layer-to-layer insulation. The conducting material included in a winding of this type may comprise one or more copper conductors disposed side by side or on top of each other. A conventional winding of this type includes a single section in which the leads are brazed to the two ends of the conducting material included in the winding. Single section spiral windings or coils are limited, however, usually to relatively large current ratings, since for smaller current ratings the conducting material becomes too thin and the windings mechanically weak. In addition, single section spiral windings of the type described are not always suitable for interleaved construction in windings which are employed for three-wire operation. It is, therefore, desirable to provide spiral windings or coils of the type described having two or more winding sections and suitable for use in lower current applications and for interleaved construction required for three-wire operation. It is also desirable to provide a suitable insulating and cooling arrangement which is uniquely adapted for a spiral winding having a plurality of winding sections of the type disclosed preferably disposed on different winding leg portions of a common magnetic core.

It is an object of this invention to provide a new and improved electrical inductive apparatus, such as a transformer.

Another object of this invention is to provide a new and improved winding and insulating arrangement for a transformer which includes a winding having a plurality of spirally wound turns of conducting sheet or strip material.

A more specific object of this invention is to provide a new construction for a core and coil assembly in an electrical inductive apparatus, such as a transformer, comprising a plurality of windings disposed on a magnetic core, at least one of said windings including a plurality of spirally wound turns of conducting strip or sheet material in which the magnetic coupling between said windings is improved.

Other objects of the invention will, in part, be obvious and will, in part, appear hereinafter.

For a fuller understanding of the nature and objects of the invention, reference should be had to the following detailed description taken in connection with the accompanying drawings, in which:

FIGURE 1 is a partial top plan view in section of a transformer core and coil assembly illustrating the teachings of this invention;

FIG. 2 is a fragmentary view in elevation illustrating how the starting leads are connected to one of the windings of the core and coil assembly shown in FIG. 1;

FIGS. 3 and 4 are diagrammatic views in section illustrating how the starting leads are connected to the winding sections of one of the windings shown in FIG. 1;

FIG. 5 is a fragmentary view in elevation illustrating the crossover members connecting the winding sections of one of the windings shown in FIG. 1;

FIGS. 6 and 7 are diagrammatic views in section illustrating the individual crossover members shown in FIG. 5;

FIG. 8 is a fragmentary view in elevation illustrating how the finish leads are connected to one of the windings shown in FIG. 1;

FIGS. 9 and 10 are diagrammatic views in section illustrating the finish leads shown in FIG. 8;

FIG. 11 is a diagrammatic top plan view illustrating how the conducting material is wound in one of the windings shown in FIG. 1;

FIG. 12 is a simplified outline drawing in elevation of the complete core and coil assembly shown in FIG. 1;

FIGS. 13 and 14 are partial schematic diagrams of some of the winding sections shown in FIG. 12;

FIG. 15 is a fragmentary view in elevation illustrating how the starting leads would be connected to a winding in a second embodiment of this invention;

FIG. 16 is a diagrammatic view in section illustrating the starting leads shown in FIG. 14;

FIG. 17 is a fragmentary view in elevation illustrating how the finish leads are connected to a winding in the second embodiment of the invention;

FIGS. 18 and 19 are diagrammatic views in section illustrating the finish leads shown in FIG. 17;

FIGS. 20 and 21 are diagrammatic views illustrating how the conducting material is wound in different winding sections of a winding in the second embodiment of the invention; and FIG. 22 is a partial schematic diagram illustrating how several winding sections are connected in the second embodiment of the invention.

Referring now to the drawing and FIGS. 1 and 12 in particular, there is illustrated a transformer core and coil assembly 100 illustrating a first embodiment of the invention. In general, the transformer core and coil assembly 100 comprises a magnetic core 40 having a first winding leg member 42 on which a first winding 50 and a second winding 30 are disposed and a second winding leg member 44 on which a first winding 60 and a second winding 80 are disposed as shown in outline in FIG. 12. The winding 60 is identical to the winding 50 and the winding 80 is identical to the winding 30. The windings 30 and 80 may be of any conventional construction and disposed in inductive relationship around the associated first windings 50 and 60, respectively, on the first and second winding leg members 42 and 44, respectively, of the magnetic core 40. Since the first windings 50 and 60 are identical, only the first winding 50 will be described in detail. It is to be understood that the teachings of this invention can be embodied in a winding disposed on a magnetic core having one or more winding leg portions.

Referring again to FIGS. 1 and 12, the first winding 50 is disposed on the first winding leg member 42, which may be of the cruciform type since the first winding 50 and the second winding 30 are preferably D-shaped in cross section. In particular, the first winding 50 comprises a first winding section 50A and a second winding section 50B, each including the outer portions 50AO and 50BO respectively and the inner portions 50AI and 50BI respectively and each having a plurality of turns of conducting sheet material spirally wound in the same direction together with a layer of insulation around the winding leg member 42 of the magnetic core 40.

Referring to FIGS. 1, 5 and 12, the inner portion 50AI of the first winding section 50A of the winding 50 includes a plurality of turns of the conducting sheet or strip material 54 which is spirally wound together with a layer of insulation 66 around a supporting member 52 which may be formed from a suitable insulating material and disposed between the first winding 50 and the winding leg member 42 of the magnetic core 40. The outer portion 50AO of the first winding section 50A similarly includes a plurality of turns of the conducting sheet material 154 spirally wound together with a layer of insulation 166 around the inner portion 50AI. Similarly, the second winding section 50B includes an inner portion 50BI and an outer portion 50BO each including a plurality of spirally wound turns of the conducting sheet materials 64 and 164 respectively and the layers of insulation 66 and 166, respectively.

Referring to FIGS. 2, 3 and 4, the manner in which the starting leads 32 and 34 are connected to the inner portions 50AI and 50BI of the first and second winding sections 50A and 50B, respectively, is illustrated. The starting lead 32 is secured or brazed to the inner end of the conducting sheet material 54 of the inner portion 50AI of the first winding section 50A. The insulation 36 which may be in the form of insulating tape or a special formed insulating tube is provided around the lead 32. The starting lead 34 is secured or brazed to the inner end of the conducting sheet material 64 from which the inner portion 50BI of the second winding section 50 is wound. A plurality of insulating collar members 46, 76 and 96 are provided to insulate the turns of each of the inner portions 50AI and 50BI of the winding sections 50A and 50B from each other and to insulate the turns of the respective inner portions 50AI and 50BI from each other. The insulating collar members 46 and 96 are provided at the upper edge of the conducting material 54 and at the lower edge of the conducting material 64, respectively, to provide additional creep insulation. The insulating filler member 44 is provided to substantially equalize the space occupied by the starting leads 32 and 34. The insulating collar members 46, 76 and 96 may be formed from an insulating strip material, such as pressboard, and secured to the layer of insulation 66 as shown in FIGS. 3 and 4 by a suitable method such as bonding or gluing with a binder.

Referring to FIGS. 1, 3 and 4, the following turn of the conducting sheet materials 54 and 64 is illustrated adjacent to the starting leads 32 and 34, respectively. A duct forming member or spacing member 82 may be provided between the adjacent turns of the winding sections 50A and 50B. Referring to FIG. 1 a plurality of duct forming members 82 may be provided or disposed in spaced relationship to provide cooling ducts between the turns of the winding sections 50A and 50B of the first winding 50. The duct forming members 82 are preferably common to both of the winding sections 50A and 50B. The duct forming members 82 may be secured or bonded to the other side of the layer of insulation 66, as shown in FIGS. 3 and 4.

Referring to FIG. 3, the starting lead 32 and its associated insulating member 36 may be disposed directly against the supporting member or tube 52. The starting lead 32 is then brazed or secured to the inner end of the conducting sheet material 54 of the inner portion 50AI of the first winding section 50A. The insulating filler member 44 is disposed between the supporting member 52 and the conducting sheet material 64 from which the inner portion 50BI of the second winding section 50B is wound. Referring to FIG. 4, the starting lead 34 and its associated insulating member 38 are disposed adjacent to the starting lead 32 directly in contact with the supporting member 52. The starting lead 34 is secured or brazed to the inner end of the conducting sheet material 64. It is to be noted that the conducting sheet materials 54 and 64 from which the turns of the inner portions 50AI and 50BI of the first and second winding sections 50A and 50B, respectively, are formed are both spirally wound in the same direction around the supporting member or tube 52, preferably simultaneously in the same winding operation.

In order to substantially equalize the magnetic coupling between the first and second winding sections 50A and 50B of the winding 50 and the second winding 30, the inner portion of each of the winding sections 50A and 50B is connected in series with the outer portion of the associated winding section of the winding 50. The latter arrangement also provides an interleaved construction which is required or desirable for three wire operation of the first windings 50 and 60 which are disposed on the first and second winding leg members 42 and 44 respectively of the magnetic core 40, as shown in FIG. 12.

Referring to FIGS. 5, 6 and 7, there is illustrated the crossover member 120, which is preferably Z-shaped, for electrically connecting the inner portion 50AI of the first winding section 50A to the outer portion 50BO of the second winding section 50B. Similarly, there is illustrated the crossover member 110, which is preferably Z-shaped, for electrically connecting the outer end of the inner portion 50BI of the second winding section 50B to the inner end of the outer portion 50AO of the first winding section 50A. As already described generally, the outer portions 50AO and 50BO of the first and second winding sections 50A and 50B respectively each comprise a plurality of turns of the conducting sheet or strip materials 154 and 164, respectively, which are spirally wound together with a layer of insulation 166. The insulating collar members 146, 176 and 196 are included in similar fashion in the outer portions 50AO and 50BO of the first and second winding sections 50A and 50B respectively to the insulating collar members 46, 76 and 96 of the inner portions 50AI and 50BI and for the same purpose. The crossover member 120 is secured or brazed to the outer end of the conducting sheet material 54 and to the inner end of the conducting sheet material 164. On the other hand, the crossover member 110 is secured or brazed to the outer end of the conducting sheet material 64 and to the inner end of the conducting sheet material 154. It is to be noted that the crossover members 110 and 120 are disposed at a point which is approximately at the midpoint of the winding of the turns of the first and second winding sections 50A and 50B. It is also to be noted that the crossover conducting members 110 and 120 are electrically insulated from each other by additional layers of insulating material 33, 35 and 37 which are separate from the layers of insulation 66 and 166 which are spirally wound together with the conducting sheet materials 54, 64, 154 and 164 as shown in FIGS. 5, 6 and 7.

Referring to FIG. 6, the connections of the crossover member 110 are shown in detail with the crossover member 120 omitted from the diagrammatic view, which is in section. The lower end of the crossover member 110 is secured or brazed to the outer end of the conducting sheet or strip material 64 from which the turns of the inner portion of the second winding section 50B are formed. The upper end of the crossover member 110 is secured or brazed to the inner end of the conducting sheet material 154 from which the turns of the outer portion 50AO of the first winding section 50A are formed. The next adjacent turn of the outer portions 50AO and 50BO is also shown in section in FIG. 6. The additional insulating layer 37 is shown between the outer end of the conducting sheet material 64 and the adjacent turn of the same conducting material 64. The additional insulating layer 35 is disposed between the crossover members 110 and 120. The additional insulating layer 33 is shown disposed between the layer of insulation 166 and the crossover member 110. The adjacent turns of the conducting sheet materials 154 and 164 and the associated insulating collar members 146 and 176 and 196 are also shown in section in FIG. 6.

Referring to FIG. 7, the connections of the crossover member 120 is shown in greater detail. In similar fashion, the crossover member 110 is omitted from the diagrammatic view in section shown in FIG. 7. The upper end of the crossover member 120 is secured or brazed to the outer end of the conducting sheet material 54 from which the turns of the inner portion 50AI of the first winding section 50A are formed. The lower end of the crossover member 120 is secured or brazed to the inner end of the conducting sheet material 164 from which the turns of the outer portion 50BO of the second winding section 50B are formed or wound. The adjacent turns of the inner and outer portions of the first and second winding sections 50A and 50B are also shown in section in FIG. 7 in similar manner to FIG. 6. The additional layers of insulation 33, 35 and 37 for insulating crossover members 110 and 120 from each other and from the adjacent turns of the first and second winding sections 50A and 50B are also shown in FIG. 7. It is to be noted that the turns of the inner and outer portions of each of the first and second winding sections 50A and 50B, respectively, are wound in the same direction.

Referring now to FIGS. 8, 9 and 10, the manner in which the finish leads are connected to the outer ends of the outer portions 50AO and 50BO of the first and second winding sections 50A and 50B, respectively, is illustrated. The finish lead 84 is secured or brazed to the outer end of the conducting strip material 154 and the finish lead 86 is secured or brazed to the outer end of the conducting strip material 164. The finish lead 84 is provided with suitable insulation 138 in the form of an insulating tape or specially formed insulating tube and the finish lead 86 is provided with insulation 136 which is in a suitable form, such as an insulating tape or a specially formed insulating tube. The insulating filler member 144 is provided to substantially equalize the space occupied by the finish leads 84 and 86.

Referring to FIG. 9, the arrangement of the finish lead 86 is shown in greater detail. The end of the layer of insulation 166 is disposed under the outer ends of the conducting sheet materials 154 and 164, and the outline 58 indicates the layer of insulation between the windings 50 and 30 which is shown in FIG. 1 to be preferably D-shaped in cross section.

Referring to FIG. 10, the arrangement of the finish lead 84 is also shown in greater detail in section. The layer of insulation 58 between the windings 50 and 30 is also shown in outline. It is to be understood that the starting leads 32 and 34, shown in FIG. 2, and the finish leads 84 and 86 may be brought out at different ends of the winding 50 in a particular application.

Referring to FIG. 11, there is illustrated in diagrammatic form the direction of winding of the turns of the conducting sheet materials 54 and 154 which make up the inner portions and outer portions 50AI and 50AO of the first winding section 50A. The same direction of winding is used for the first and second winding sections 50A and 50B respectively. The starting leads 32 and 34 are indicated as being disposed at the inside of the winding 50 and the finish leads 84 and 86 are indicated generally as being disposed at the outside of the winding 50.

Referring to FIG. 13, the operation of the winding 50 disposed on a magnetic core having a single winding leg portion is illustrated by an equivalent schematic diagram. The first winding section 50A comprises the outer portion 50AO and the inner portion 50AI. The second winding section 50B comprises the outer portion 50BO and the inner portion 50BI. The outer portion 50AO of the first winding section 50A is connected in series circuit relation with the inner portion 50BI of the second winding section 50B. Similarly, the inner portion 50AI of the first winding section 50A is connected in series with the outer portion 50BO of the second winding section 50B.

The upper end of the outer portion 50AO of the first winding section 50A is connected to the terminal 78 by the finish lead 84. The upper end of the inner portion 50AI of the first winding 50A is connected to the terminal 88 through the starting lead 32. The lower end of the outer portion 50BO of the second winding section 50B is connected to the terminal 68 through the finish lead 86. The lower end of the inner portion 50BI of the second winding section 50B is connected to the terminal 98 through the starting lead 34.

For a series, two wire connection of the winding 50, the external terminals 78 and 88 are connected together with a conductor (not shown) and the terminals 68 and 98 are connected to a source of alternating current (not shown) for a particular voltage rating. For a parallel connection of the winding 50, the terminals 68 and 78 are connected together by a conductor (not shown) and the terminals 88 and 98 are connected together by a separate conductor (not shown). Each of the pairs of terminals 68 and 88 and 78 and 98 respectively would then be connected to a source of alternating current (not shown) having an associated voltage rating which is half as large as the voltage rating associated with the series connection. For series, three wire operation, the terminals 78 and 88 are connected together by a conductor (not shown) and the terminals 68 and 98 along with the pair of terminals 78 and 88 are connected to a three-wire source of alternating current (not shown).

Referring to FIG. 14, the operation of the first winding 50 and the first winding 60 disposed on the winding leg members 42 and 44, respectively, can more readily be appreciated by considering an equivalent schematic diagram for one of several possible connections of the said windings. Considering the first winding 50, the first winding section 50A comprises the outer portion 50AO and the inner portion 50AI. The second winding section 50B comprises an outer portion 50BO and an inner portion 50BI. The outer portion 50AO of the first winding section 50A is connected in series circuit relation with the inner portion 50BI of the second winding section 50B. In like manner, the inner portion 50AI of the first winding section 50A is connected in series circuit relation with the outer portion 50BO of the second winding section 50B by the crossover member 120. The upper end of the outer portion 50AO of the first winding section 50A is connected to the upper end of the inner portion 60AI of the first winding section 60A through the finish lead 84 and the conductor 185. The upper end of the inner portion 50AI of the first winding section 50A is connected to the terminal 168 through the starting lead 32. The lower end of the outer portion 50BO of the second winding section 50B is connected to the lower end of the inner portion 60BI of the second winding section 60B of the winding 60 through the finish lead 86 and the conductor 187. The lower end of the inner portion 50BI of the second winding section 50B is connected to the terminal 178 through the starting lead 34. The first winding 60 disposed on the winding leg member 44 includes the first and second winding sections 60A and 60B similarly to the winding 50 and is connected similarly to the terminals 188 and 198 and to the winding 50 in similar fashion as shown in FIG. 14.

For a series, two wire connection of the windings 50 and 60, the external terminals 178 and 198 are connected together with a conductor (not shown) and the terminals 168 and 188 are connected to a source of alternating current (not shown) for a particular voltage rating. For a parallel connection of the windings 50 and 60, the terminals 168 and 178 are connected together by a conductor (not shown) and the terminals 188 and 198 are connected together by a separate conductor (not shown). Each of the pairs of terminals 168 and 178 and 188 and 198 respectively would then be connected to one side of a source of alternating current (not shown) having an associated voltage rating which is half as great as the voltage rating associated with the series connection. For series, three-wire operation, the terminals 178 and 198 are connected together by a conductor (not shown), and the terminals 168 and 188 along with the pair of terminals 178 and 198 would then be connected to a three-wire source of alternating current (not shown).

In summary, a winding including a plurality of winding sections as disclosed with suitable crossover members connecting the different portions of the winding sections substantially equalizes the coupling between such a winding and a second winding disposed on a common magnetic core and provide an interleaved construction which permits the application of an unbalanced three-wire load and reduces the circulating currents in a winding as disclosed and the associated losses to thereby increase the efficiency of a transformer core and coil assembly incorporating the teachings of the invention. When one of the windings of a transformer core and coil assembly, such as the winding 50, includes the crossover connections and members as disclosed, it is not necessary to provide interleaving in the associated second winding 30 in order to insure substantially equal magnetic coupling between the different winding sections of the winding 50 and the winding 30.

Referring to FIGS. 15 through 22, there is illustrated a second embodiment of the invention which is particularly applicable for smaller current ratings required in a transformer winding. In general, the second embodiment of the invention is similar to the first embodiment of the invention shown in FIGS. 1 through 14 and previously described except that a winding of the second type does not include the crossover members and connections which were included in the winding of the first type disclosed. In other words, the winding of the second type does not include an interleaved construction such as included in a winding of the first type.

In particular, a winding 250 of the second type includes a first winding section 250A as shown diagrammatically in FIG. 20 and a second or lower winding section 250B as shown in FIG. 21. The winding sections 250A and 250B each include a plurality of turns of the conducting sheet materials 254 and 264, respectively, which are spirally wound in opposite directions around a portion of a magnetic core (not shown) which is similar to the magnetic core 40 shown in FIG. 12.

The first and second winding sections 250A and 250B are spirally wound in opposite directions around a supporting member or insulating tube 252 which would be disposed between the winding 250 and a magnetic core (not shown). The manner in which the winding of the winding sections 250A and 250B is started is shown in detail in FIGS. 15 and 16. One of the winding sections 250A and 250B is wound first on the supporting member 252 in a predetermined direction. For example, the second winding section 250B comprises a plurality of turns of a conducting sheet or strip material 264 and a layer of insulation 266 which are spirally wound together around the supporting member 252. The first step in the winding of the second winding section 250B is to secure or braze a preferably L-shaped member 210 to the inner end of the conducting sheet material 264. The insulating collar members 276 and 296 are provided on each side of the conducting sheet material 64 and may be secured or bonded to the layer of insulation 266 to provide additional insulation between the turns of the second winding section 250B and between the turns of the first and second winding sections 250A and 250B respectively.

The next step in winding the second winding section 250B is to place an insulating filler member 255 between the L-shaped member 210 and the adjacent turn of the layer of insulation 266 as shown in FIG. 16. A plurality of turns of the conducting sheet material 264 and the associated layer of insulation 266 are, then, spirally wound around the supporting member 252 in a first predetermined direction. The first winding section 250A is then started by securing or brazing the inner end of the conducting sheet material 254 to the upper end of the L-shaped member 210 as shown in FIG. 15. An insulating filler member 253 is, then, placed between the preferably L-shaped member 210 and the adjacent turn of the layer of insulation 265 which is spirally wound together with the turns of the conducting sheet material 254 to form the first winding section 250A. As shown in FIG. 16, the first winding section 250A also includes first and second insulating collar members 246 and 275 which are disposed on each side of the conducting sheet material 254 and which may be secured or bonded to one side of the associated layer of insulation 265 for the same purpose as the insulating collar members 276 and 296. The insulating collar members 246 and 296 also provide additional creep insulation between the adjacent turns of the first and second winding sections 250A and 250B, respectively. The inner ends of the first and second winding sections 250A and 250B are, therefore, electrically connected together by the generally L-shaped member 210 which is formed from a conducting material. As already noted, the first and second winding sections 250A and 250B are wound in opposite directions about the supporting member 252.

Referring to FIGS. 17, 18 and 19, the manner in which the finish leads are secured or connected to the first and second winding sections 250A and 250B is illustrated. The finish lead 232 is secured or brazed to the outer end of the conducting sheet material 254 from which the turns of the first winding section 250A are wound. The finish lead 232 is provided with a suitable insulation 236, which may be in the form of an insulating tape or a specially formed insulating tube. The finish lead 234 is secured or brazed to the outer end of the conducting sheet material 264 from which the turns of the second winding section 250B are wound and is similarly provided with a suitable insulation 238. An insulating filler member 267 is provided below the finish lead 232 in order to substantially equalize the space occupied by the finish leads 232 and 234, respectively.

Referring to FIG. 18, the detailed arrangement of the finish lead 232 is illustrated. The insulation between the winding 250 and a second winding (not shown) is indicated in outline by 258 which would form the winding-to-winding insulation in a complete transformer core and coil assembly. The winding-to-winding insulation 258 would be disposed in similar fashion to the winding-to-winding insulation 58 shown in FIG. 1. The arrangement of the finish lead 234 is shown in detail in FIG. 19. The winding-to-winding insulation which would also surround the finish lead 234 and its associated insulating member 238 is similarly indicated at 258. The insulating filler member 267 may be formed from a suitable insulating material, such as pressboard.

It is to be understood that duct forming members or spacing members (not shown) may be included in a winding 250 incorporating the teachings of this invention. Such duct forming members would be disposed in similar fashion to the duct forming members 82 shown in FIG. 1 between adjacent turns of the winding 250 to provide cooling ducts for more efficient cooling of the winding 250. Such duct forming members, as well as the duct forming members 82 shown in FIG. 1, may be formed from a suitable insulating material, such as wood rods.

Referring to FIG. 22, an equivalent partial schematic diagram is shown for the winding 250 and an identical winding 260 which would be each disposed on a winding leg member of a magnetic core (not shown) similarly to the windings 50 and 60 shown in FIG. 12. The L-shaped member 210 connecting the first and second winding sections 250A and 250B of the winding 250 in series is conveniently located at the inner end of each of said winding sections. Therefore, in order to insure the proper polarity of the induced voltages in the first and second winding sections 250A and 250B, respectively, the first and second winding sections 250A and 250B must be wound in opposite directions since the current flow in the winding section 250A would otherwise be opposite to that in the winding section 250B with respect to the inner and outer ends of each of said winding sections.

The outer end of the first winding section 250A is connected through the finish lead 232 to the terminal 312. The outer end of the second winding section 250B as illustrated is connected to the terminal 310 through the finish lead 234. The winding 260 is connected in similar manner to the terminals 320 and 322. For parallel operation of the windings 250 and 260, the terminals 312 and 320 would be connected to the terminal 302 and the terminals 310 and 322 would be connected to the terminal 300 as shown in FIG. 22. The terminals 300 and 302 would then be connected to a source of alternating current (not shown). For series operation of the windings 250 and 260, said windings would be reconnected so that instead the terminals 310 and 320 would be connected together and terminals 312 and 322 would, then, be connected to a source of alternating current (not shown) having an associated voltage rating which is twice as great as for the parallel connection of the windings 250 and 260. It is it be noted that the winding 250 as disclosed would be employed with an associated adjacent winding disposed in similar fashion to the winding 30 shown in FIG. 1 with an interleaved construction provided in the associated winding if required.

In summary, a winding of the second type as disclosed in FIGS. 15 through 22 does not include a crossover arrangement as disclosed for winding of the first type but instead provides a winding having a plurality of winding sections each including a plurality of turns of conducting sheet material and a layer of insulation spirally wound together about a portion of a magnetic core (not shown) and with the inner ends of each of the winding sections connected together by a generally L-shaped conducting member. An important difference between a winding of the second type and a winding of the first type as previously disclosed is that the first and second winding sections of the winding 250 must be wound in opposite directions because of the connection between the inner ends of each of the first and second winding sections 250A and 250B of the winding 250.

It is to be understood that a winding arrangement of the type disclosed may be provided with the start and finish leads disposed on either the same side of the respective winding sections or on opposite sides of the respective winding sections. It is obvious that the shape of the windings may be other than the generally D-shaped cross-section disclosed. For example, the shape of the coil may be substantially rectangular, oval or circular while still incorporating the teachings of this invention.

The connections between several windings of the type disclosed which are disposed on different winding leg members of a common magnetic core may also be varied from those shown in the accompanying drawings in a particular application and the teachings of the invention may be embodied in one or more windings disposed on one or more leg portions of a common magnetic core.

It is important to note that the teachings of this invention may be incorporated in single phase windings disposed on one or more leg portions of a magnetic core or in three phase windings disposed on three or more leg portions of an associated magnetic core.

The apparatus embodying the teachings of this invention has several advantages. For example, a compact winding of the type disclosed including a plurality of winding sections each having inner and outer portions which are interconnected by crossover members provides an interleaved construction required in certain applications and substantially equalizes the magnetic coupling between the winding sections of a first winding as disclosed and a second winding disposed in inductive relation therewith to reduce circulating currents and the associated losses. In addition, a winding of the type disclosed lends itself to convenient assembly since the duct forming members and the insulating collar members associated with the spirally wound layer of insulation may be wound simultaneously with the associated conducting sheet material from which the turns of the various winding sections are formed. Further, the lead connections to the different winding sections of a winding as disclosed are conveniently made to external terminals associated with a transformer core and coil assembly.

Since numerous changes may be made in the above-described apparatus and different embodiments of the invention may be made without departing from the spirit thereof, it is intended that all the matter contained in the foregoing description or shown in the accompanying drawings shall be interpreted as illustrative and not in a limiting sense.

I claim as my invention:

1. An electrical inductive apparatus comprising a magnetic core, a first winding including first and second winding sections disposed about a portion of said magnetic core and displaced from one another along the portion of said core, said first and second winding sections each comprising inner and outer portions each including a plurality of turns of conducting sheet material spirally wound around a portion of said core, the turns of said first and second winding sections being both wound in the same direction, a second winding disposed in inductive relation with said first winding about a portion of said core, a first crossover member formed from conducting sheet material and disposed to electrically connect the inner portion of said first winding section in series circuit relation with the outer portion of said second winding section and a second cross-over member formed from conducting sheet material and disposed to electrically connect the outer portion of said first winding section in series circuit relation with the inner portion of said second winding section to substantially equalize the magnetic coupling between each winding section of said first winding and said second winding.

2. An electrical inductive apparatus comprising a magnetic core, a first winding including first and second winding sections disposed about a portion of said magnetic core and displaced from one another along the portion of said core, said first and second winding sections each comprising inner and outer portions each including a plurality of turns of conducting sheet material spirally wound around a portion of said core, the turns of said first and second winding sections being both wound in the same direction, a second winding disposed in inductive relation with said first winding about a portion of said core, a first generally Z-shaped member formed from conducting sheet material and disposed to electrically connect the inner portion of said first winding section in series circuit relation with the outer portion of said second winding section and a second generally Z-shaped member formed from conducting sheet material and disposed to connect the outer portion of said first winding section to the inner portion of said second winding section to substantially equalize the magnetic coupling between each winding section of said first winding and said second winding.

3. A transformer comprising a magnetic core, a first winding including first and second winding sections disposed end to end on a portion of said core, said first and second winding sections each comprising outer and inner portions each having a plurality of turns of conducting sheet material and an insulation layer spirally wound together about a portion of said core, the turns of said first and second winding sections being both wound in the same direction, a second winding inductively disposed adjacent to said first winding on said core portion, first and second generally Z-shaped members each formed from conducting sheet material and disposed to electrically connect the inner portion of one winding section in series circuit relation with the outer portion of the other winding section to substantially equalize the magnetic coupling between said first and second windings.

4. A transformer comprising a magnetic core, a first winding including first and second winding sections disposed around a portion of said core and displaced from one another along the portion of said core, a support-member disposed between said first winding and said core, said first and second winding sections each comprising outer and inner portions each having a plurality of turns of conducting sheet material and a layer of insulation spirally wound together, a plurality of insulating collar members secured to one side of said layer of insulation to provide insulation between the conducting material of said winding sections and creep insulation at the edges of said turns of said winding sections, the turns of said first and second winding sections being both wound in the same direction, a second winding inductively disposed around said winding, and first and second crossover members each formed from conducting sheet material and disposed to electrically connect the inner portion of one winding section in series circuit relation with the outer portion of the other winding section to substantially equalize magnetic coupling between said first and second windings.

5. A transformer comprising a magnetic core, a first winding including first and second winding sections disposed end to end around a portion of said core, a hollow cylindrical supporting member formed from electrically insulating material disposed between said first winding and said core, said first and second winding sections each comprising outer and inner portions each having a plurality of turns of conducting sheet material and a layer of insulation spirally wound together, a plurality of insulating collar members secured to one side of said layer of insulation to provide insulation between the conducting material of said winding sections and creep insulation at the edges of said turns of said winding sections, the turns of said first and second winding sections being both wound in the same direction, a second winding inductively disposed around both winding sections of said first winding, and first and second generally Z-shaped members each formed from conducting sheet material and disposed to electrically connect the inner portion of one winding section in series circuit relation with the outer portion of the other winding section to substantially equalize the magnetic coupling between said first and second windings.

6. A transformer comprising a magnetic core, a first winding including first and second winding sections disposed on a portion of said core and displaced from one another along the portion of said core, said first and second winding sections each comprising outer and inner portions each having a plurality of turns of conducting sheet material and a layer of insulation spirally wound together about said core, a plurality of duct-forming members secured to one side of said layer of insulation to provide cooling ducts in said first winding, the turns of said first and second winding sections being both wound in the same direction, a second winding concentrically disposed adjacent to said first winding, and first and second crossover members each formed from conducting sheet material and disposed to electrically connect the inner portion of one winding section in series circuit relation with the outer portion of the other winding section to substantially equalize the magnetic coupling between said first and second windings.

7. A transformer comprising a magnetic core, a first winding including first and second winding sections disposed end to end on a portion of said core, said first and second winding sections each comprising outer and inner portions each having a plurality of turns of conducting sheet material and a layer of sheet insulation spirally wound together about said core, a plurality of duct-forming members secured to one side of said layer of insulation to provide cooling ducts in said first winding, the turns of said first and second winding sections being both wound in the same direction, a second winding concentrically disposed adjacent to said first winding on said portion of said core, and first and second generally Z-shaped members each formed from conducting sheet material and disposed to electrically connect the inner portion of one winding section in series circuit relation with the outer portion of the other winding section to substantially equalize the magnetic coupling between the different winding sections of said first winding and said second winding.

8. A transformer comprising a magnetic core, a first winding including first and second winding sections disposed on a portion of said core and displaced from one another along the portion of said core, said first and second winding sections each comprising outer and inner portions each having a plurality of turns of conducting strip material and a layer of insulation spirally wound together about said core, a plurality of insulating collar members secured to one side of said layer of insulation at least at the edges thereof to additionally insulate the turns of said winding sections from each other, a plurality of duct-forming members secured to the other side of said layer of insulation to provide cooling ducts in said first winding, the turns of said first and second winding sections being both wound in the same direction, a second winding inductively disposed concentrically about both winding sections of said first winding, and first and second crossover members each formed from conducting sheet material and disposed to electrically connect the inner portion of one winding section in series circuit relation with the outer portion of the other winding section to provide an interleaved construction in said first winding.

9. A transformer comprising a magnetic core, a first winding including first and second winding sections disposed end to end on a portion of said core, said first and second winding sections each comprising outer and inner portions each having a plurality of turns of conducting strip material and a layer of insulation spirally wound together about said core, a plurality of insulating collar members secured to one side of said layer of insulation to additionally insulate the turns of said winding sections from each other, a plurality of duct-forming members secured to the other side of said layer of insulation to provide cooling ducts in said first winding, the turns of said first and second winding sections being both wound in the same direction, a second winding inductively disposed concentrically about both winding sections of said first winding, and first and second generally Z-shaped crossover members each formed from conducting sheet material and disposed to electrically connect the inner portion of one winding section in series circuit relation with the outer portion of the other winding section to provide an interleaved construction in said first winding.

10. A transformer comprising a magnetic core, a first winding including first and second winding sections each having an inner opening disposed end to end with the inner openings substantially aligned with respect to each other on a portion of said core, said first and second winding sections each comprising outer and inner portions each having a plurality of turns of conducting sheet material and an insulation layer spirally would together about a portion of said core, the turns of said first and second winding sections being both wound in the same direction, a second winding inductively disposed concentrically with respect to both of the winding sections of said first winding on said core portion, first and second generally Z-shaped members each formed from conducting sheet material and disposed to electrically connect the inner portion of one winding section in series circuit relation the outer portion of the other winding section to substantially equalize the magnetic coupling between said first and second windings.

11. An electrical inductive apparatus comprising a magnetic core, a first winding including first and second winding sections disposed in end to end relation with respect to each other about a portion of said magnetic core, said first and second winding sections each comprising inner and outer portions each including a plurality of turns of conducting sheet material spirally wound around a portion of said core, the turns of said first and second winding sections being both wound in the same direction, a second winding disposed concentrically with respect to and in inductive relation with both of the winding sections of said first winding about a portion of said core, a first generally Z-shaped member formed from conducting sheet material and disposed to electrically connect the inner portion of said first winding section in series circuit relation with the outer portion of said second winding section and a second generally Z-shaped member formed from conducting sheet material and disposed to connect electrically the outer portion of said first winding section in series circuit relation with the inner portion of said second winding section to substantially equalize the magnetic coupling between each winding section of said first winding and said second winding.

12. A transformer comprising a magnetic core, a first winding including first and second winding sections each having a generally D-shaped inner opening disposed in spaced relation with respect to each other on a portion of said core with the inner openings in substantial registry, said first and second winding sections each comprising outer and inner portions each having a plurality of turns of conducting sheet material and a layer of insulation spirally wound together about said core, a plurality of duct-forming members secured to one side of said layer of insulation to provide cooling ducts in said first winding, a second winding concentrically disposed adjacent to said first winding on said portion of said core, and first and second generally Z-shaped members each formed from conducting sheet material and disposed to electrically connect the inner portion of one winding section in series circuit relation with the outer portion of the other winding section to substantially equalize the magnetic coupling between said first and second windings.

References Cited in the file of this patent
UNITED STATES PATENTS

| | | |
|---|---|---|
| 217,466 | Le Conte | July 15, 1879 |
| 1,200,233 | Preston | Oct. 3, 1916 |
| 1,872,247 | Cole et al. | Aug. 16, 1932 |
| 2,441,804 | Farry | May 18, 1948 |
| 2,710,947 | Gaston | June 14, 1955 |
| 2,863,130 | Gray et al. | Dec. 2, 1958 |